United States Patent
Yu et al.

(10) Patent No.: US 11,807,025 B2
(45) Date of Patent: Nov. 7, 2023

(54) PLASTIC MATERIAL FOR PRINTING BY DYE DIFFUSION THERMAL TRANSFER PRINTING

(71) Applicants: Evonik Operations GmbH, Essen (DE); Evonik Specialty Chemicals (Shanghai) Co., Ltd., Shanghai (CN)

(72) Inventors: Huifeng Yu, Shanghai (CN); Jianmin Yang, Shanghai (CN); Fei Teng, Shanghai (CN); Chenyu Ye, Shanghai (CN); Florian Hermes, Haltern am See (DE); Martin Wielpütz, Senden (DE)

(73) Assignees: Evonik Operations GmbH, Essen (DE); Evonik Specialty Chemicals (Shanghai) Co., Ltd., Shanghai (CN)

( * ) Notice: Subject to any disclaimer, the term of this patent is extended or adjusted under 35 U.S.C. 154(b) by 365 days.

(21) Appl. No.: 17/250,085

(22) PCT Filed: May 25, 2018

(86) PCT No.: PCT/CN2018/088511
§ 371 (c)(1),
(2) Date: Nov. 23, 2020

(87) PCT Pub. No.: WO2019/223008
PCT Pub. Date: Nov. 28, 2019

(65) Prior Publication Data
US 2021/0206187 A1    Jul. 8, 2021

(51) Int. Cl.
*B41M 5/385* (2006.01)
*B41M 5/52* (2006.01)

(52) U.S. Cl.
CPC .......... *B41M 5/385* (2013.01); *B41M 5/5263* (2013.01); *B41M 2205/02* (2013.01)

(58) Field of Classification Search
CPC . B41M 5/385; B41M 5/5263; B41M 2205/02
USPC ..................................................... 428/32.6
See application file for complete search history.

(56) References Cited

U.S. PATENT DOCUMENTS

| | | | |
|---|---|---|---|
| 5,334,573 A | 8/1994 | Schild | |
| 5,840,807 A * | 11/1998 | Frey | C08L 77/00 525/178 |
| 8,003,201 B2 | 8/2011 | Luetzeler et al. | |
| 8,357,455 B2 | 1/2013 | Baumann et al. | |
| 8,470,433 B2 | 6/2013 | Haeger et al. | |
| 8,535,811 B2 | 9/2013 | Luetzeler et al. | |
| 9,546,273 B2 | 1/2017 | Huelsmann et al. | |
| 9,567,444 B2 | 2/2017 | Neuhaeuser et al. | |
| 2001/0021442 A1 | 9/2001 | Steinbeck et al. | |
| 2002/0012773 A1 | 1/2002 | Vaidya et al. | |
| 2003/0068477 A1 | 4/2003 | Nakanishi et al. | |
| 2003/0203146 A1 | 10/2003 | Nakanishi | |
| 2006/0281846 A1 | 12/2006 | Hager et al. | |
| 2006/0281873 A1 | 12/2006 | Alting et al. | |
| 2007/0173581 A1 | 7/2007 | Hager et al. | |
| 2008/0119632 A1 | 5/2008 | Baumann et al. | |
| 2008/0213552 A1 | 9/2008 | Hager et al. | |
| 2009/0318630 A1 * | 12/2009 | Montanari | C08L 77/00 525/432 |
| 2011/0244209 A1 | 10/2011 | Luetzeler et al. | |
| 2012/0308801 A1 | 12/2012 | Neuhaeuser et al. | |
| 2015/0099847 A1 | 4/2015 | Huelsmann et al. | |
| 2016/0295705 A1 * | 10/2016 | Stoeppelmann | C08K 7/14 |
| 2020/0255660 A1 * | 8/2020 | Durand | C08K 3/36 |
| 2021/0206187 A1 * | 7/2021 | Yu | C08G 69/40 |

FOREIGN PATENT DOCUMENTS

| | | |
|---|---|---|
| CN | 1320836 | 11/2001 |
| CN | 1405012 | 3/2003 |
| CN | 1409666 | 4/2003 |
| CN | 1453143 | 11/2003 |
| EP | 0 673 788 | 10/1997 |
| WO | 98/07573 | 2/1998 |
| WO | 2020/136136 | 7/2020 |

OTHER PUBLICATIONS

Transfer Sheet, CN 1405012 A (Year: 2003).*
Shearmur et al., "Study of dye diffusion in polymers using Rutherford backscattering," Polymer, vol. 37, No. 13, pp. 2695-2700, 1996.
Slark et al., "The effect of specific interactions on dye transport in polymers above the glass transition," Polymer 40, 1999, 4001-4011.
Extended European Search Report dated Jan. 10, 2020 in European Patent Application No. 18882267.0, 5 Pages.
U.S. Appl. No. 10/591,289, filed Aug. 31, 2006, 2007/0173581, Hager et al.
U.S. Appl. No. 10/544,401, filed Aug. 2, 2005, 2006/0281846, Hager et al.
U.S. Appl. No. 17/250,084, filed Nov. 23, 2020, Yu et al.
U.S. Appl. No. 17/250,267, filed Dec. 22, 2020, Yu et al.
International Search Report dated Feb. 25, 2019 in PCT/CN2018/088511.
Written Opinion dated Feb. 25, 2019 in PCT/CN2018/088511.
Supplementary European Search Report dated Jan. 10, 2020 in European Application No. 18882267.0.

* cited by examiner

*Primary Examiner* — Betelhem Shewareged
(74) *Attorney, Agent, or Firm* — Grüneberg and Myers PLLC

(57) ABSTRACT

A plastic material is useful as an ink receiver or printing medium in dye diffusion thermal transfer printing, wherein the plastic material has a polyamide component (a), and a (co)-polyamide (b) based on ether units and amide units. This plastic material can be used to make a layered structure. The layered structure can be used in dye diffusion thermal transfer printing. A security and/or valuable document with the layered structure can be obtained. Based on the finding that the (co)-polyamide (h) offers sufficient absorbency for the printing ink, the layer produced from the plastic material can be printed on by means of dye diffusion thermal transfer printing with a good color intensity.

23 Claims, 1 Drawing Sheet

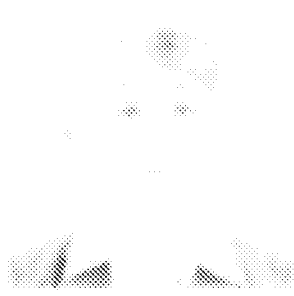
Fig. 1
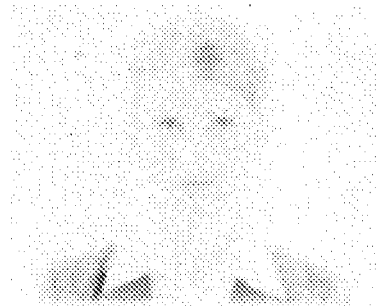
Fig. 2
Fig. 3
Fig. 4
Fig. 5
Fig. 6
Fig. 7
Fig. 8
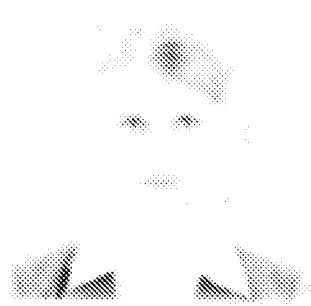
Fig. 9

PLASTIC MATERIAL FOR PRINTING BY DYE DIFFUSION THERMAL TRANSFER PRINTING

CROSS-REFERENCE TO RELATED APPLICATIONS

This application is the National Stage entry under § 371 of International Application No. PCT/CN2018/088511, filed on May 25, 2018, the content of which is hereby incorporated by reference in its entirety.

BACKGROUND OF THE INVENTION

Field of the Invention

The present invention relates to a plastic material which is suitable as the ink receiver or printing medium for printing by means of dye diffusion thermal transfer printing.

Description of Related Art

In the production of security and/or valuable documents, in particular identification documents in the form of cards (ID cards), there is the need for coloured personalization of the documents, but without lowering the forgery security thereof. There have been many different set-ups for rendering possible a coloured personalization with a high forgery security. One of these consists of the use of dye diffusion thermal transfer printing of coloured information on substrates of plastic as an alternative to other printing processes, since this offers the advantage of a high image accuracy in coloured printing, and images and information personalized on the spot can also be printed in good quality by this means. In this printing variant the printing ink furthermore should be absorbed into the plastics material to be printed, so that no intentional breaking sites for subsequent separation are formed by a separate colour layer in the documents.

Diverse plastics materials have already been discussed in the literature for printability by means of dye diffusion thermal transfer printing. Thus, according to Stark et al., Polymer 40 (1999) 4001-4011 diverse plastics are suitable as materials for dye acceptor coatings, but without concrete preferences being mentioned there. WO 98/07573 A1 discloses dye acceptor coatings of polyvinyl chloride copolymers. In Shearmur et al., Polymer 37, vol. 13 (1996) 2695-2700, diverse polyesters and polyvinyl butyral are investigated as possible materials for dye acceptor layers. U.S. Pat. No. 5,334,573 investigates suitable materials with the aim of avoiding sticking of the dye acceptor sheets to the dye donor sheets. EP 673 778 B1 discloses thermotransfer receiver films with a coated, metallized polymer surface as the receiver film. Plastics, such as PVC, vinyl acetate/vinyl chloride copolymers, polyvinylidene acetals, PMMA and silicone surfaces based on polymers are mentioned here in particular for the receiver layer.

When substrates of plastic are used for such printing, however, there is the problem that the surface of the substrate of plastic must offer an adequate absorbency for the printing ink, without the image sharpness and colour intensity thereby being impaired. In many cases, the colour intensity of the printed images in particular is in need of improvement. Therefore there is a need for an alternative plastic material which is suitable for printing by means of dye diffusion thermal transfer printing.

The present inventors explored the possibility for polyamides to be printed by dye diffusion thermal transfer printing and completed the present invention.

SUMMARY OF THE INVENTION

The present invention provides use of a plastic material as the ink receiver or printing medium in dye diffusion thermal transfer printing, wherein the plastic material comprises
   (a) a polyamide component (a), and
   (b) a (co)-polyamide (b) based on ether units and amide units.

The present invention also provides a one layer structure produced from the plastic material.

The present invention further provides a layered structure comprising:
   (A) at least one Layer (A) comprising a thermoplastic plastic, and
   (B) at least one Layer (B) produced from the plastic material as above described.

The present invention further provides use of the layered structure of the present invention in dye diffusion thermal transfer printing, wherein the Layer(s) (B) is printed on by means of dye diffusion thermal transfer printing.

The present invention further provides a process for the production of the layered structure of present invention, comprising bonding the various films of plastic to one another by a process selected from lamination, coextrusion, in mould labeling, and direct gluing.

The present invention further provides a security and/or valuable document, comprising the layered structure of the present invention.

The present invention is based on the finding that
   (1) the (co)-polyamide (b) offers sufficient absorbency for the printing ink, and
   (2) Layer(s) (B) produced from the plastic material comprising a polyamide component (a) and a (co)-polyamide (b), can be printed on by means of dye diffusion thermal transfer printing, and a good colour intensity of the printed image is achieved.

BRIEF DESCRIPTION OF THE DRAWINGS

FIG. 1 shows the image printed by dye diffusion thermal transfer printing on the E1 sample.

FIG. 2 shows the image printed by dye diffusion thermal transfer printing on the E2 sample.

FIG. 3 shows the image printed by dye diffusion thermal transfer printing on the E3 sample.

FIG. 4 shows the image printed by dye diffusion thermal transfer printing on the E4 sample.

FIG. 5 shows the image printed by dye diffusion thermal transfer printing on the E5 sample.

FIG. 6 shows the image printed by dye diffusion thermal transfer printing on the E6 sample.

FIG. 7 shows the image printed by dye diffusion thermal transfer printing on the E7 sample.

FIG. 8 shows the image printed by dye diffusion thermal transfer printing on the CE1 sample.

FIG. 9 shows the image printed by dye diffusion thermal transfer printing on the CE2 sample.

DETAILED DESCRIPTION OF THE INVENTION

The plastic material comprises
(a) a polyamide component (a), and
(b) a (co)-polyamide (b) based on ether units and amide units.

Preferably, the polyamide component (a) consists of based on the total weight thereof at least 50 wt %, more preferably at least 80 wt %, and most preferably 95 wt % a polyamide selected from the group consisting of:

((a1) a linear aliphatic polyamide of the AB type having 10-12 carbon atoms, produced by polymerizing lactams having from 10-12 carbon atoms in the monomer unit or by polycondensing a ω-aminocarboxylic acids having from 10-12 carbon atoms in the monomer unit, or (a2) a linear aliphatic polyamide of the AABB type, produced by polycondensing diamines having 6-14 carbon atoms in the monomer units and dicarboxylic acids having 9-14 carbon atoms in the monomer unit, or (a3) a cycloaliphatic polyamide, produced by polycondensing a cycloaliphatic diamine having 10-20 carbon atoms in the monomer units and an aliphatic dicarboxylic acid having 8-18 carbon atoms in the monomer units, optionally further produced by a lactam having 6-14 carbon atoms or a linear aliphatic ω-aminocarboxylic acid having 6-14 carbon atoms, or (a4) a semi-aromatic polyamide based on an cycloaliphatic diamine having 10-20 carbon atoms and an aromatic dicarboxylic acid having 8-18 carbon atoms, optionally further produced by a lactam having 6-14 carbon atoms or a linear aliphatic ω-aminocarboxylic acid having 6-14 carbon atoms, (a5) a semi-aromatic polyamide based on an aliphatic diamine having 2-12 carbon atoms and an aromatic dicarboxylic acid having 8-18 carbon atoms, optionally further produced by a lactam having 6-14 carbon atoms or a linear aliphatic ω-aminocarboxylic acid having 6-14 carbon atoms, and the compound thereof as well as the copolymer thereof.

Polyamides (a1) to (a5) are suitable polyamide components. Preferred polyamides are (a1), (a2), or (a3), more preferably (a1) or (a3) and especially (a1).

The linear aliphatic polyamide (a1) has from 10-12 carbon atoms in the individual monomer units. Said linear aliphatic polyamide is producible from a combination of a diamine and a dicarboxylic acid, from an w-aminocarboxylic acid and/or the corresponding lactam. The monomer units in question are therefore the units which derive from the lactam, ω-aminocarboxylic acid, diamine or dicarboxylic acid. Suitable linear aliphatic polyamides (a1) further include copolyamides which comprise diamines having 6-14 carbon atoms in the monomer unit and dicarboxylic acids having 9-14 carbon atoms in the monomer unit (e.g. PA12/1012).

The following polyamides (a1), (a2) are suitable by way of example: PA88, PA79, PA97, PA610, PA106, PA99, PA810, PA108, PA612, PA126, PA10, PA1010, PA812, PA128, PA614, PA146, PA11, PA1012, PA1210, PA913, PA139, PA814, PA148, PA616, PA12, PA1212, PA1113, PA1014, PA1410, PA816, PA618 and compounds as well as copolyamides based on these systems.

Commercially available products of the linear aliphatic polyamide (a1) are for example PA12 products under the tradename of VESTAMID® L, commercially available from Evonik Resource Efficiency GmbH, such as VESTAMID® L2101F and VESTAMID® L1940.

Suitable cycloaliphatic diamines of the cycloaliphatic polyamide (a3) and the semi-aromatic polyamide (a4) are for example bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMDC), 2,2-(4,4'-diaminodicyclohexyl)propane (PACP), and the mixtures thereof.

Suitable aliphatic dicarboxylic acids are for example sebacic acid, undecanedioic acid, dodecanedioic acid, tridecanedioic acid (brassylic acid), tetradecanedioic acid, pentadecanedioic acid, hexadecanedioic acid, and the mixtures thereof.

Suitable aromatic dicarboxylic acids are for example isophthalic acid, terephthalic acid, and naphthalene dicarboxylic acid, and the mixtures thereof.

The cycloaliphatic polyamide (a3) is typically produced from the cycloaliphatic diamine and the dicarboxylic acid and optionally the aromatic dicarboxylic acid by polycondensation in the melt according to known processes. However, derivatives thereof may also be employed, for example the diisocyanate which derives from the cycloaliphatic diamine, or a dicarboxylic diester which derives from the dicarboxylic acid.

Preferably, the cycloaliphatic polyamide (a3) is selected from the group consisting of MACM10, MACM11, MACM12, MACM13, MACM14, MACM16, PACM10, PACM11, PACM12, PACM13, PACM14, PACM16, TMDC10, TMDC11, TMDC12, TMDC13, TMDC14, TMDC15, TMDC16, and compounds as well as copolyamides based on these systems.

Preferably, the semi-aromatic polyamide (a4) is selected from the group consisting of MACMI/12, MACMT/12, PACMI/12, PACMT/12, and compounds as well as copolyamides based on these systems.

The cycloaliphatic diamine may exist as a mixture of isomers. For example, PACM may exist as a mixture of cis, cis; cis, trans and trans, trans isomers. It is commercially available with various isomer ratios. In one preferred embodiment the trans, trans isomer content of the PACM or of the employed derivative thereof is 30-70% and particularly preferably from 35-65%.

More preferably, the cycloaliphatic polyamide (a3) or the semi-aromatic polyamide (a4) is transparent with a haze of less than 3% and particularly preferably of less than 2% where both properties are determined to ASTM D1003 on injection moulded test specimens of 2 mm in thickness.

Commercially available products of the cycloaliphatic polyamide (a3) are for example PA PACM12 products under the tradename of TROGAMID®, commercially available from Evonik Resource Efficiency GmbH, such as TROGAMID® CX7323 and TROGAMID® CX9704.

The semi-aromatic polyamide (a5) is based on an aliphatic diamine having 2-12 carbon atoms and an aromatic dicarboxylic acid having 8-18 carbon atoms.

Suitable aliphatic diamines are for example ethylenediamine, butanediamine, pentanediamine, hexamethylenediamine, octanediamine, methyloctanediamine, nonanediamine, decanediamine, undecanediamine, dodecanediamine, trimethylhexamethylenediamine, methylpentanediamine, and the mixtures thereof.

Suitable aromatic dicarboxylic acids are for example isophthalic acid, terephthalic acid, and naphthalene dicarboxylic acid, and the mixtures thereof.

Preferably, the semi-aromatic polyamide (a5) is selected from the group consisting of PA6I/6T, PA 10T/6T, PA6T/6I and PA6-3-T and compounds as well as copolyamides based on these systems.

Commercially available products of the semi-aromatic polyamide (a5) are for example PA6-3-T products under the tradename of TROGAMID® and PA6I/6 T products under the tradename of VESTAM ID® HTplus, both commercially available from Evonik Resource Efficiency GmbH, such as TROGAMID® T5000 and VESTAM ID® HTplus M5000.

The (co)-polyamide (b) is based on ether units and amide units.

Preferably, the (co)-polyamide (b) is selected from PEBA copolymers composed of blocks of amide units and of sequences of ether units.

PEBA copolymers are sequential multiblock copolymers and belong to the specific category of polyetheresteramides or polyetheramides, when they result from the copolycondensation of polyamide sequences comprising reactive carboxyl ends with polyether sequences comprising reactive ends which are polyether polyols(polyether diols), the bonds between the polyamide blocks and the polyether blocks being ester bonds, or else to the category of polyetheramides or polyether-block-amides, when the polyether sequences comprise amine ends. Both the two above families are included in the definition of the (co)-polyamide (b).

The ether units or sequences of the (co)-polyamide (b) result, for example, from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG) and their blends or their copolymers.

The polyether blocks can also comprise, as indicated above, polyoxyalkylene sequences comprising $NH_2$ chain ends, it being possible for such sequences to be obtained by cyanoacetylation or reductive amination of $\alpha,\omega$-dihydroxylated aliphatic polyoxyalkylene sequences referred to as polyether diols. More particularly, it will be possible to use Elastamine® grades (for example, Elastamine® RP405, RP2005, RE900, RE2003, RTP 542, commercial products from Huntsman. See also Patents JP 2004346274, JP 2004352794 and EP1482011).

The amide units or blocks of the (co)-polyamide (b) can in particular be residues of linear aliphatic monomers, such as:
  linear aliphatic diamines, such as 1,4-tetramethylenediamine, 1,6-hexamethylene-diamine, 1,9-nonamethylenediamine and 1,10-decamethylenediamine; or cycloaliphatic diamines, most preferably based on 1,4-disubstituted cyclohexane backbones.
  aliphatic dicarboxylic acids which can be selected from aliphatic dicarboxylic acids having 6-36 carbon atoms, preferably 9-18 carbon atoms, in particular 1,10-decanedicarboxylic acid (sebacic acid), 1,12-dodecanedicarboxylic acid, 1,14-tetradecanedicarboxylic acid and 1,18-octadecanedicarboxylic acid;
  lactams, such as caprolactam, oenantholactam and lauryllactam; and
  $\alpha,\omega$-aminocarboxylic acids, such as aminocaproic acid, 7-aminoheptanoic acid, 11-aminoundecanoic acid or 12-aminododecanoic acid; and
  aromatic or cycloaliphatic diacids, most preferably based on 1,4-disubstituted cyclohexane backbones.

Mention may be made, as PEBA copolymers which are particularly preferred for the (co)-polyamide (b) of those composed of amide units which are residues of linear aliphatic monomers and of polyether sequences of PTMG, PPG or PEG type, it being possible for the residues of linear aliphatic monomers in particular to be residues of a diamine and of a diacid.

For the PEBAs which can be used as the (co)-polyamide (b), the number-average molecular weight of the polyimide blocks is preferably 500-12,000 g/mol, more preferably 2,000-6,000 g/mol; and the number-average molecular weight of the sequences of ether units is preferably 200-4,000 g/mol, preferably 300-1,100 g/mol.

The polyamide block units can represent 20-95%, more preferably 40-95% by weight of the (co)-polyamide (b).
(co)-polyamide (b)(co)-polyamide (b)(co)-polyamide (b)

Commercially available products of the (co)-polyamide (b) are for example PEBA (poly-ether-block-amide) products under the tradename of VESTAMID®, commercially available from Evonik Resource Efficiency GmbH, such as VESTAMID® E40-S3, E62-S3, E55-S3, E47-S3, and E58-S4.

Preferably, the plastic material comprises based on the total weight thereof:
  5-95%, more preferably 20-80%, most preferably 30-70% of the polyamide component (a), and
  5-95%, more preferably 20-80%, most preferably 30-70% of the (co)-polyamide (b).

The plastic material may include other ingredients, such as stabilizers, lubricants, colorants, plasticizers, nucleants, antioxidants, impact modifiers and UV absorbers, depending on the desired performance without impairing the transparency significantly. Preferably, these ingredients are added in low amounts, typically up to 20 wt %, more preferably up to 5 wt % of the total composite.

In one embodiment of the present invention, the plastic material consists of the specified ingredients.

The plastic material can be produced for example in a twin-screw compounding extruder at conventional processing temperatures for polyamide component (a) and the (co)-polyamide (b).

Preferably, the one layer structure produced from the plastic material of the present invention is a film.

The layered structure of the present invention comprises:
  (A) at least one Layer (A) comprising a thermoplastic plastic, and
  (B) at least one Layer (B) made of the plastic material as above described.

There is no limit to the thermoplastic plastic of Layer (A), examples of which include cellulose acetate propionate, cellulose acetate butyrate, polyesters, polyamides, polycarbonates, polyimides, polyolefins, polyvinylchlorides, polyvinylacetals, polyethers and polysulphonamides. Preferably, the thermoplastic plastic of Layer (A) is a polyamide identical to the polyamide of Layer (B) for compatibility reason.

Preferably, Layer (A) is a white or translucent layer.

A white or translucent Layer (A) is preferably a layer coloured white with pigments or having a filler content of fillers. Such layers, preferably layers of plastic, coloured white or having a filler content of fillers preferably comprise titanium dioxide, zirconium dioxide, barium sulfate or glass fibres as pigments and/or fillers. The pigments or fillers mentioned are preferably added to the plastics before the shaping to give the Layer (A), which can be carried out, for example, by extrusion or coextrusion, in amounts of 2-60 wt %, particularly preferably 10-40 wt %, based on the total weight of pigment or filler and plastics material.

Preferably, the layered structure comprise at least three layers wherein Layer (A) is between two layers (B).

Such an at least three-layered structure has the advantage that, when it is incorporated into a security document, it is not necessary to ensure that the Layer (B) (which is printable by means dye diffusion thermal transfer printing) is oriented outwards.

The layered structure of the present invention can have one or more further layer(s) comprising at least one thermoplastic plastic between the Layer (A) and the Layer(s) (B). These can be translucent or white layers, transparent layers or coloured layers.

The layered structure of the present invention can be produced, for example and preferably, by means of lamination, coextrusion, in mould labeling, and direct gluing of the layers that are present.

The layered structure according to the invention is particularly preferably suitable for identification and/or valuable documents in the form of bonded or laminated layers in the form of plastics cards.

The layered structure of the present invention, is outstandingly suitable as a component of security documents, preferably identification documents, which are to be printed by means dye diffusion thermal transfer printing.

Accordingly, the invention further provides an identification and/or valuable document, comprising at least the layered structure of the present invention. The identification and/or valuable documents are for example identification cards, passports, driving licenses, credit cards, bank cards, cards for controlling access or other identity documents, etc.

The identification and/or valuable document can further comprise additional layers which provide protection against UV radiation, protection against mechanical and chemical damage etc.

DRAWINGS

FIGS. 1-7 are the images printed by dye diffusion thermal transfer printing on the samples of the examples (E1-E7);

FIGS. 8-9 are the images printed by dye diffusion thermal transfer printing on the samples of the comparative examples (CE1-CE2).

EXAMPLES

Material
  TROGAM ID® CX7323: PA PACM12, a polyamide produced from bis(4-aminocyclohexyl)methane and also dodecanedioic acid; $\eta_{rel}$=1.8; commercially available from Evonik Resource Efficiency GmbH;
  VESTAMID® L2101F: a base-unit PA12 with $\eta_{rel}$=2.2, commercially available from Evonik Resource Efficiency GmbH;
  VESTAMID® E58-S4: a polyether-block-amide which is a copolymer consisting of PA12 blocks and polyether blocks with $\eta_{rel}$=1.8. (PA12 elastomer), commercially available from Evonik Resource Efficiency GmbH;
  Ti-Pure™ R-105: Titanium dioxide, commercially available from the Chemours Company;
  Ultranox® 626: Phosphite commercially available from Addivant Germany GmbH.

Preparation of Polyamide Compounds

Polyamide compounds of the examples and comparative examples having the compositions and the weight percentages as indicated in the following Table 1 were prepared in a twin-screw compounding extruder (Coperion ZSK-26mc) at conventional processing temperatures for TROGAMID® CX7323 of 260-300° C. or for VESTAMID® L2101F of 250-300° C.

Preparation of the Films Made of the Polyamide Compounds

The installation used consisted of an extruder (Dr. Collin E20M) with a screw of 20 mm diameter (D) and length of 25×D and T-die head with 25 mm slot width.

The films were prepared according to the following process:

The granules of the polyamide compounds were dried and fed into the hopper. The granules were then melted and in situ extruded out from the die. The melt of the polymer compounds came out from the die and dropped at the polishing calendar. Final shaping and cooling of the films took place on the polishing calendar consisting of three rolls. The films made of the polymer compounds with a thickness of 0.1 mm were obtained.

TABLE 1

| Polyamide compounds and the films made thereof | | | | | | | | | | | |
|---|---|---|---|---|---|---|---|---|---|---|---|
| | E1 | E2 | E3 | E4 | E5 | E6 | E7 | CE1 | CE2 | S1 | S2 |
| TROGAMID ® CX7323 (wt %) | 90 | 70 | 50 | 30 | | | | 100 | | 84.8 | |
| VESTAMID ® L2101F (wt %) | | | | | 80 | 60 | 40 | | 100 | | 84.8 |
| VESTAMID ® E58-S4 (wt %) | 10 | 30 | 50 | 70 | 20 | 40 | 60 | | | | |
| Ti-Pure ™ R-105 (wt %) | | | | | | | | | | 15 | 15 |
| Ultranox ® 626 (wt %) | | | | | | | | | | 0.2 | 0.2 |

Preparation of Samples of a Sandwich Structure

Samples of a sandwich structure having two outer layers and five core layers as following were prepared:
  two outer layers: a film of E1-E7 and CE1-CE2;
  five core layers: a film of S1-S2 which has the same polyamide as the outer layers.

The films of the individual layers of the sandwich structure were stacked in a mold for lamination. The mold was then transferred to a plate press machine (Collin P 300P). The films were heated to 160-200° C. for 15 min, then laminated under a pressure of 5-35 bar and cooled to 23° C. Samples of the sandwich structure had a thickness of 0.78-0.82 mm were obtained and then cut to have a dimension of 53.98 mm×85.60 mm as ID cards. The final composition of the samples is indicated in the following Table 2.

Printing of the Samples of the Sandwich Structure by Dye Diffusion Thermal Transfer Printing (D2T2 Printing)

Printing experiments were carried out on the samples of the sandwich structure on an installation from Datacard® CD800 Card Printer with the following parameters:
  Colour ribbon: Datacard 535000-003 YMCKT Colour Ribbon Resolution: 300×600 dpi A coloured image of a woman's portrait was printed on one outer layer of the sandwich structure. Image quality was assessed. The result is indicated in FIGS. 1-9 and Table 2.

Image quality is graded as following:
- Poor (−): outline of the portrait is difficult to recognize, colours are barely transferred on the substrate from the ribbon;
- Low (+): the outline of the portrait can be reorganized but without clearly defined facial features;
- Medium (++): the outline of the portrait can be reorganized, facial features can be clearly observed but with some colour distortion;
- High (+++): the outline of the portrait can be reorganized, facial features can be clearly observed with high colour intensity.

TABLE 2

Composition and performance of the examples and comparative examples

|  | E1 | E2 | E3 | E4 | E5 | E6 | E7 | CE1 | CE2 |
|---|---|---|---|---|---|---|---|---|---|
| Outer layers | | | | | | | | | |
| TROGAMID ® CX7323 (wt %) | 90 | 70 | 50 | 30 | | | | 100 | |
| VESTAMID ® L2101F (wt %) | | | | | 80 | 60 | 40 | | 100 |
| VESTAMID ® E58-S4 (wt %) | 10 | 30 | 50 | 70 | 20 | 40 | 60 | | |
| Core layers | | | | | | | | | |
| TROGAMID ® CX7323 (wt %) | 84.8 | 84.8 | 84.8 | 84.8 | | | | 84.8 | |
| VESTAMID ® L2101F (wt %) | | | | | 84.8 | 84.8 | 84.8 | | 84.8 |
| Ti-Pure ™ R-105 (wt %) | 15 | 15 | 15 | 15 | 15 | 15 | 15 | 15 | 15 |
| Ultranox ® 626 (wt %) | 0.2 | 0.2 | 0.2 | 0.2 | 0.2 | 0.2 | 0.2 | 0.2 | 0.2 |
| Performance | | | | | | | | | |
| Image quality | + | ++ | +++ | +++ | ++ | +++ | +++ | − | + |

For TROGAMID® CX7323, there was barely no image printed on the comparative example CE1 without VESTAMID® E58-S4 (FIG. 8), while the image quality was improved in the examples E1-E4 (FIGS. 1-4) with the increased content of VESTAMID® E58-S4. A similar result was observed for VESTAMID® L2101F, i.e. the image printed on the comparative example CE2 without VESTAMID® E58-S4 was very light (FIG. 9), while the image quality was improved in the examples E5-E7 (FIGS. 5-7) with the increased content of VESTAMID® E58-S4. It can be seen that the image quality can be improved by the polyether-block-amide (e.g. VESTAMID® E58-S4) added to the plastic material.

The invention claimed is:

1. A method for dye diffusion thermal transfer printing, comprising:
   thermally transferring an ink and/or dye onto a plastic material,
   wherein the plastic material comprises:
   (a) a polyamide component (a), and
   (b) a (co)-polyamide (b) based on ether units and amide units,
   wherein the (co)-polyamide (b) is selected from the group consisting of poly-ether-block-amide (PEBA) copolymers comprising blocks of amide units and sequences of ether units,
   wherein the plastic material comprises 20-80% of the PEBA copolymers.

2. The method of claim 1, wherein
the polyamide component (a) comprises, based on the total weight thereof, at least 50 wt % of a polyamide selected from the group consisting of:
   (a1) a linear aliphatic polyamide of the AB type having 10-12 carbon atoms, produced by polymerizing a lactam having from 10-12 carbon atoms in the monomer unit or by poly condensing a ω-aminocarboxylic acid having from 10-12 carbon atoms in the monomer unit,
   (a2) a linear aliphatic polyamide of the AABB type, produced by polycondensing a diamine having 6-14 carbon atoms in the monomer unit and a dicarboxylic acid having 9-14 carbon atoms in the monomer unit,
   (a3) a cycloaliphatic polyamide, produced by polycondensing a cycloaliphatic diamine having 10-20 carbon atoms in the monomer unit and an aliphatic dicarboxylic acid having 8-18 carbon atoms in the monomer unit, optionally further produced by a lactam having 6-14 carbon atoms or a linear aliphatic w-aminocarboxylic acid having 6-14 carbon atoms,
   (a4) a semi-aromatic polyamide based on a cycloaliphatic diamine having 10-20-carbon atoms and an aromatic dicarboxylic acid having 8-18 carbon atoms, optionally further produced by a lactam having 6-14 carbon atoms or a linear aliphatic ω-aminocarboxylic acid having 6-14 carbon atoms,
   (a5) a semi-aromatic polyamide based on an aliphatic diamine having 2-12 carbon atoms and an aromatic dicarboxylic acid having 8-18 carbon atoms, optionally further produced by a lactam having 6-14 carbon atoms or a linear aliphatic ω-aminocarboxylic acid having 6-14 carbon atoms,
   and a compound or a copolymer thereof.

3. The method of claim 2, wherein
the linear aliphatic polyamide (a1) or (a2) is used and is selected from the group consisting of: PA88, PA79, PA97, PA610, PA106, PA99, PA810, PA108, PA612, PA126, PA10, PA1010, PA812, PA128, PA614, PA146, PA11, PA1012, PA1210, PA913, PA139, PA814, PA148, PA616, PA12, PA1212, PA1113, PA1014, PA1410, PA816, PA618, and a compound thereof.

4. The method of claim 2, comprising the cycloaliphatic polyamide (a3) or the semi-aromatic polyamide (a4), which is based on
- a cycloaliphatic diamine selected from the group consisting of bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMDC), 2,2-(4,4'-diaminodicyclohexyl)propane (PACP), and a mixture thereof,
- an aliphatic dicarboxylic acid selected from the group consisting of sebacic acid, undecanedioic acid, dodecanedioic acid, tridecanedioic acid (brassylic acid), tetradecanedioic acid, pentadecanedioic acid, hexadecanedioic acid, and a mixture thereof, and
- optionally an aromatic dicarboxylic acid selected from the group consisting of isophthalic acid, terephthalic acid, naphthalene dicarboxylic acid, and a mixture thereof.

5. The method of claim 2, wherein the cycloaliphatic polyamide (a3) is used and is selected from the group consisting of MACM10, MACM11, MACM12, MACM13, MACM14, MACM16, PACM10, PACM11, PACM12, PACM13, PACM14, PACM16, TMDC10, TMDC11, TMDC12, TMDC13, TMDC14, TMDC15, TMDC16, MACMI/12, MACMT/12, PACMI/12, PACMT/12, and a mixture or a copolyamide based on these systems.

6. The method of claim 5, wherein the cycloaliphatic polyamide (a3) is selected from the group consisting of PACM10, PACM11, PACM12, PACM13, PACM14, and PACM16 having a content of trans, trans isomer of 30-70%.

7. The method of claim 2, wherein the cycloaliphatic polyamide (a3) is used and is transparent with a haze of less than 3%, and wherein both properties are determined according to ASTM D1003 on injection moulded test specimens of 2 mm in thickness.

8. The method of claim 1, wherein the ether units of the (co)-polyamide (b) result from at least one polyalkylene ether polyol.

9. The method of claim 1, wherein the (co)-polyamide (b) comprises amide units, which are residues of linear aliphatic monomers, and polyether sequences of PTMG, PPG, or PEG type.

10. The method of claim 1, wherein a number-average molecular weight of the polyamide blocks is 500-12,000 g/mol, and/or
a number-average molecular weight of the sequences of ether units is 200-4,000 g/mol.

11. The method of claim 1, wherein the (co)-polyamide (b) includes amide units for which the number of carbons per amide is on average at least equal to 9, and/or
the amide units of the (co)-polyamide (b) represent 50-95% by weight of the (co)-polyamide (b).

12. The method of claim 1, wherein the plastic material comprises, based on the total weight thereof:
30-70% of the polyamide component (a), and
30-70% of the (co)-polyamide (b).

13. The method of claim 1, wherein
the plastic material further comprises up to 20%, by weight of the plastic material, of one or more additional ingredients, selected from the group consisting of: stabilizers, lubricants, colorants, plasticizers, nucleants, antioxidants, impact modifiers and UV absorbers.

14. The method of claim 1, wherein the plastic material consists of the specified ingredients.

15. A one-layer structure produced from the plastic material as defined in claim 1.

16. A layered structure, comprising:
(A) at least one Layer (A) comprising a thermoplastic plastic, and
(B) at least one Layer (B) produced from the plastic material as defined in claim 1.

17. The layered structure of claim 16, wherein
the thermoplastic plastic of Layer (A) is selected from the group consisting of cellulose acetate propionate, cellulose acetate butyrate, polyesters, polyamides, polycarbonates, polyimides, polyolefins, polyvinylchlorides, polyvinylacetals, polyethers and polysulphonamides.

18. The layered structure of claim 16, wherein
Layer (A) is a white or translucent layer, and/or
Layer (A) is between two Layers (B), and/or
between Layer (A) and the Layer(s) (B), the layered structure has at least one further layer comprising at least one thermoplastic plastic.

19. A process for the production of the layered structure of claim 16, the process comprising:
bonding films of plastic to one another by a process selected from the group consisting of lamination, coextrusion, in mould labeling, and direct gluing.

20. A method for dye diffusion thermal transfer printing, comprising:
diffusion thermal transfer printing a dye onto the Layer(s) (B) of a layered structure comprising:
(A) at least one Layer (A) comprising a thermoplastic plastic, and
(B) at least one Layer (B) produced from the plastic material as defined in claim 1.

21. A security document and/or valuable document, comprising:
the layered structure of claim 16.

22. The method of claim 2, wherein the ether units of the (co)-polyamide (b) result from at least one polyalkylene ether polyol.

23. The method of claim 12, wherein the (co)-polyamide (b) contains PA12 blocks and polyether blocks, and the polyamide component (a) comprises PACM 12 or PA12.

* * * * *